United States Patent [19]

Alexander et al.

[11] Patent Number: 4,650,259

[45] Date of Patent: Mar. 17, 1987

[54] METHOD AND APPARATUS FOR TENSIONING GROUND ENGAGING ENDLESS ELASTOMERIC BELTS

[75] Inventors: Phillip W. Alexander; Michael S. Freberg; Keith A. Howell, all of Davenport, Iowa; James E. Johnston, Geneseo, Ill.

[73] Assignee: Caterpillar Inc., Peoria, Ill.

[21] Appl. No.: 796,831

[22] Filed: Nov. 12, 1985

[51] Int. Cl.⁴ .................... B62D 55/14; B62D 55/30
[52] U.S. Cl. .......................................... 305/10; 305/28; 305/31; 305/32; 305/35 EB
[58] Field of Search .................. 305/22, 10, 28, 31, 305/32, 35 EB

[56] References Cited

U.S. PATENT DOCUMENTS

| | | |
|---|---|---|
| 1,522,157 | 1/1925 | Tracy et al. |
| 1,885,430 | 11/1932 | George ........................ 305/32 X |
| 1,906,415 | 5/1933 | Rauch . |
| 2,717,813 | 9/1955 | Gardner ........................ 305/31 |
| 2,887,342 | 5/1959 | Helsel, Sr. ..................... 305/31 X |
| 2,959,451 | 11/1960 | Weber ........................... 305/32 X |
| 2,998,998 | 9/1961 | Hyler et al. ................... 305/31 |
| 3,101,977 | 8/1963 | Hyler et al. ................... 305/10 |
| 3,912,335 | 10/1975 | Fisher .......................... 305/10 |
| 3,930,553 | 1/1976 | Kopera et al. .................. 180/9.28 |
| 3,980,351 | 9/1976 | Orr et al. ...................... 305/22 X |
| 4,088,377 | 5/1978 | Corrigan ....................... 305/31 X |
| 4,227,748 | 10/1980 | Meisel, Jr. ..................... 305/10 |
| 4,413,862 | 11/1983 | Ragon .......................... 305/10 |

FOREIGN PATENT DOCUMENTS 1923732 11/1970 Fed. Rep. of Germany ........ 305/10
2164942 7/1972 Fed. Rep. of Germany ... 305/35 EB Primary Examiner—David A. Scherbel
Attorney, Agent, or Firm—Joseph W. Keen

[57] ABSTRACT

Method and apparatus for selectively tensioning an endless, inextensible elastomeric belt entrained about a cooperating drive structure and idler structure having respective axes of rotation. A roller frame joined to a vehicular main frame supports the idler structure and constrains movement thereof to a longitudinal recoil path. The drive and idler structures are biasingly separated by a compression spring which exerts biasing force thereon in opposite longitudinal directions through a drive strut and an idler strut, respectively. The idler strut is connected to the idler structure longitudinally in front of the idler's axis. The length of one of the struts is adjustable to provide the desired tension in the spring and, thus, the entraining belt. Increases in tension are preferably provided by displacing one component member of the one strut relative to a second component member thereof-one of such members being reciprocatably receivable in the other and provided with a seal therebetween such that the two members cooperatively define a pressurizable chamber. Pressurized fluid, when transmitted into the pressurizable chamber, provides relative longitudinal displacement of the two members so as to decrease the spring and belt tension. A locking assembly threadably engaged with one of the members is rotated until it abuts the other member and permits the fluid pressure to be reduced while maintaining the length of such adjustable strut.

21 Claims, 4 Drawing Figures

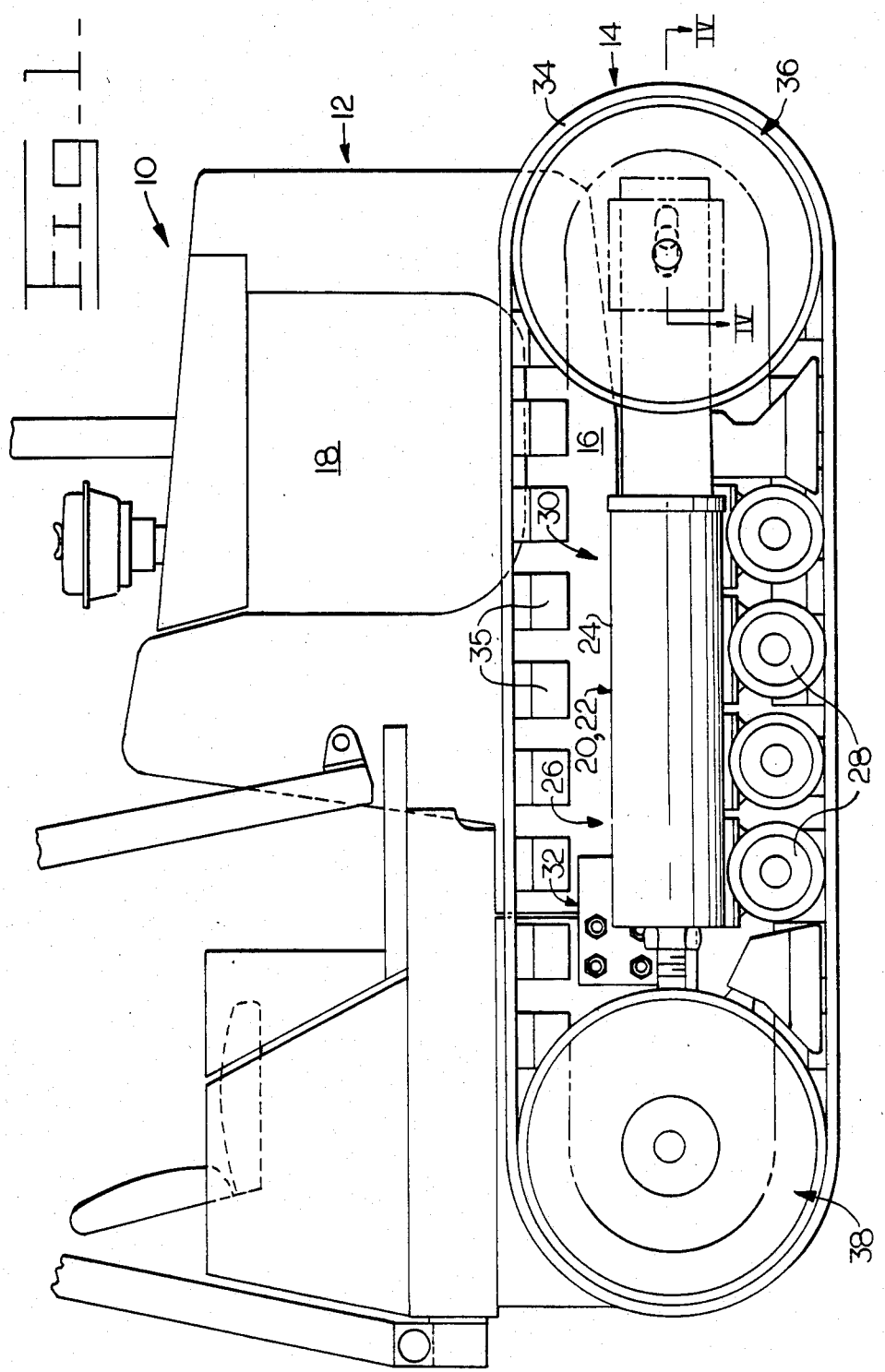

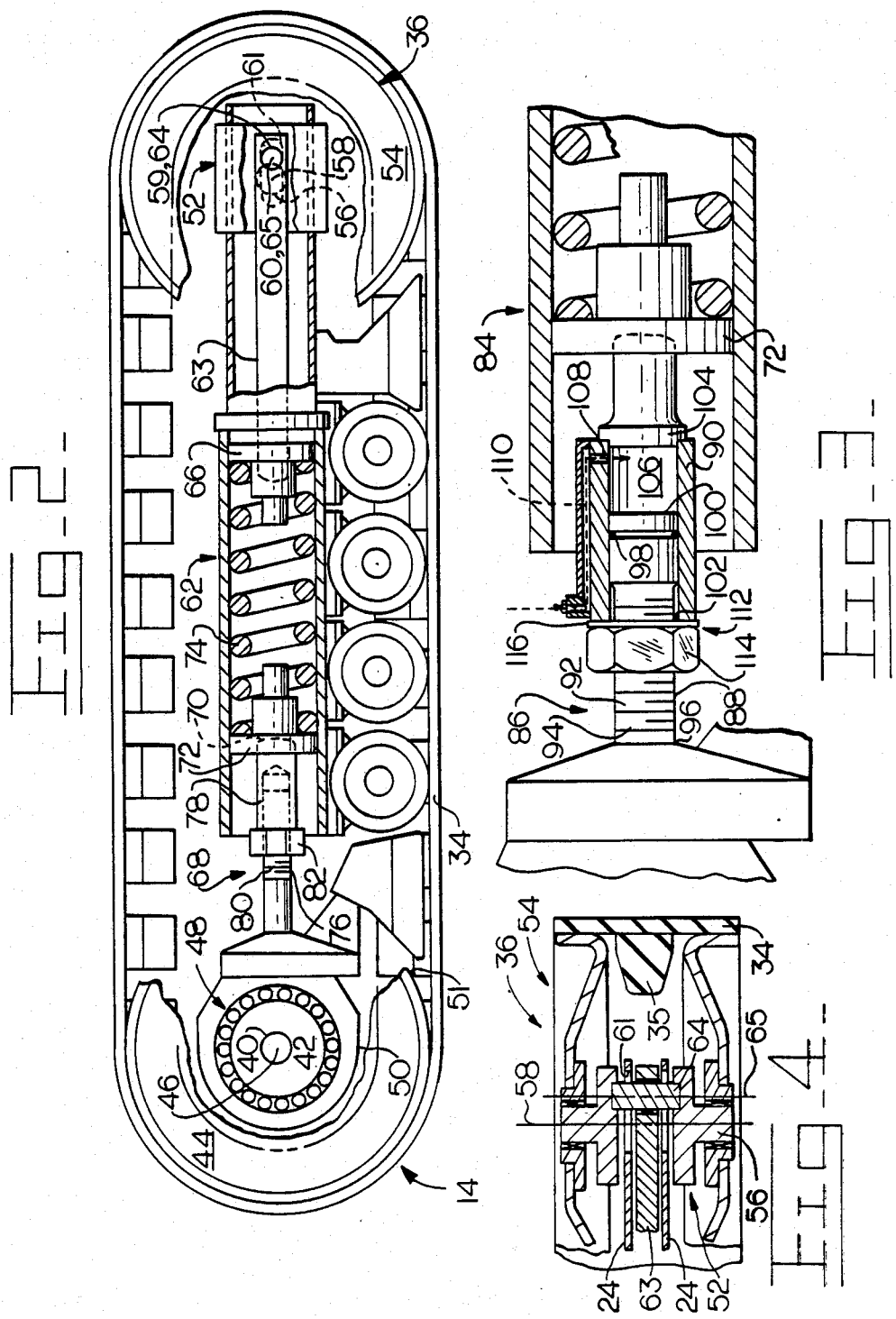

4,650,259

METHOD AND APPARATUS FOR TENSIONING GROUND ENGAGING ENDLESS ELASTOMERIC BELTS

DESCRIPTION

1. Technical Field

This invention relates to vehicular propulsion systems and, more particularly, to means for tensioning endless, elastomeric, inextensible frictionally driven belts each entrained about a driver and an idler structure.

2. Background Art

Vehicles utilizing continuous ground-engaging apparatus (e.g. track or belt) require same to be tensioned within a specified range for acceptable vehicle performance. Hydraulic tensioning apparatus such as is illustrated in the following U.S. patents perform the requisite tensioning but, in some circumstances such as extended periods of vehicle shutdown, can lose tensioning pressure past seals, through loose fittings, and otherwise: U.S. Pat. No. 4,227,748, issued Oct. 14, 1980, assigned to the assignee of the present invention and U.S. Pat. No. 3,101,977, issued Aug. 27, 1963. Minimum acceptable tensions for positive drive systems has been found to be lower than the minimum acceptable tension for frictional drive systems such as are respectively illustrated in U.S. Pat. Nos. 4,227,748 and 3,101,977. Hydraulic tensioning apparatus pressure losses are often unacceptable for frictional drives unless supplemented by other means, due to the time delay experienced from vehicle start up until sufficient tensioning pressure is available to provide vehicular mobility.

Other track tensioning devices include those illustrated in U.S. Pat. Nos. 1,906,415, patented May 2, 1933, 1,522,157, patented Jan. 6, 1925, 3,930,553, patented Jan. 6, 1976, and 2,998,998, patented Sept. 5, 1961. Experience has shown that endless ground engagement members entrained about circular wheel-like elements must have a system which provides recoil capability or the ability for the axis of rotation of one or more of the entrained wheel elements to move in order to accommodate debris and other matter which is inadvertently ingested between such wheels and the ground engagement members without damaging any of such components. U.S. Pat. Nos. 3,930,553, 2,998,998, and 1,906,415 appear to lack provisions for such recoil capability other than deflection of the wheels' pneumatic tires and are thus believed to have significant disadvantages when used in heavy-duty, earthworking environments. Moreover, U.S. Pat. No. 2,998,998 provides increased belt tension by pivoting the rotation axis of its idler element relative to its roller frame. Pivoting of that rotation axis causes changes in the orientation of the utilizing vehicle, the spacial relationship among drive components, and the height of the connection point for ground engaging implements. These changes detract from operator comfort, reduce drive component reliability, and introduce wide variations in implement ground penetration.

The vehicle illustrated in U.S. Pat. No. 1,522,157 has a tensioning apparatus which includes recoil provisions but has driver wheel elements and idler wheel elements which are supported from the vehicle's main frame. Such idler wheel elements are rotatably and translatably displaceable relative to the main frame and thus require additional framework and provisions for accommodating relative movement. Such framework and movement accommodation may reduce the reliability, increase the cost, and add weight to the vehicle. The illustrated vehicle also uses dual tensioning/recoil devices for each cooperating set of driver/idler wheels which can cause unfavorable cocking thereof and reduce the effectiveness of the entraining ground-engaging member. Accordingly, the present invention is intended to overcome one or more of the aforementiond problems and/or disadvantages. losure of the lnvention

DISCLOSURE OF THE INVENTION

In accordance with the present invention, a belt laying work vehicle is provided having a main frame, a drive structure extonding from a lateral side of the main frame, a roller frame for supporting the main frame and arranged on such lateral side of the main frame, an idler structure slidably and rotatably mounted on the roller frame, an endless elastomeric belt entrained about the drive structure and idler structure, and means for biasing the belt into frictional driven engagement with a radially outwardly facing surface of the drive structure and for providing a compensating force on the drive structure which is equal in magnitude but opposite in direction to the force exerted thereon by the belt. A method is provided for adjusting the tension of an inextensible, endless ground-engagement belt entrained about a drive structure extending from a vehicle main frame and an idler structure slidably and rotatably mounted on a roller frame rigidly connected to the main frame wherein the driver and idler structures are respectively connected to a drive strut and an idler strut engaged with opposite ends of a spring, which method includes lengthening one of the struts until the belt is frictionally coupled with a radially outwardly facing surface of the drive structure and locking the strut in its lengthened configuration.

BRIEF DESCRIPTION OF THE DRAWINGS

The advantages of the present invention will become apparent from the following description when read in conjunction with the accompanying drawings, in which FIG. 1.is a side elevational view of a belted work vehicle in which the invention is exemplified;

FIG. 2 is an enlarged partial sectional view of a portion of the vehicle in FIG. 1 illustrating a first embodiment of its tensioning/recoil apparatus;

FIG. 3 is an enlarged partial sectional view of a portion of the vehicle illustrated in FIG. 1 illustrating a second embodiment of the tensioning/recoil apparatus; and FIG. 4 is a sectional view taken along section line IV—IV of FIG. 1.

BEST MODE FOR CARRYING OUT THE INVENTION

In the description which follows, like reference numerals indicate like structure. Referring now to the drawings in detail, FIG. 1 illustrates a belt laying work vehicle 10 having a chassis 12 and an undercarriage 14 which is arranged in supporting relation to the chassis 12. The chassis 12 includes a main frame 16 and an engine compartment 18 within which an engine (not shown) is housed. The undercarriage 14 includes a first 20 and a second 22 belt roller frame assembly arranged in supporting relation to the main frame 16 on either lateral side thereof. Only the "near" belt roller frame assembly 20 is illustrated in FIG. 1 since it is understood that the corresponding and identical belt roller assembly 22 is arranged on the opposite side of the main frame 16. Accordingly, due to the substantial identity therebetween, further reference and description of the belt roller frame assemblies and their components will be limited to the roller frame assembly 20.

The belt roller frame assembly 20 includes a roller frame 24, a biasing/recoil apparatus 26 partially housed within the frame 24, and a set of rollers 28 mounted on the frame 24. The roller frame 24 is rigidly connected to the main frame 16 at a front location 30 (the actual connection is hidden by the roller frame 24) and a rear location 32. An endless, inextensible, elastomeric belt 34 having guide elements 35 is entrained about an idler structure 36 and a drive structure 38 which are respectively disposed adjacent the front and rear longitudinal ends of the main frame 16.

FIG. 2 is a partial sectional view of the undercarriage 14 illustrated in FIG. 1. The drive structure 38, as shown in FIG. 2, includes a drive shaft 40 which transmits power from the vehicle engine and protrudes laterally from the main frame 16, a hub 42 which is connected to the drive shaft 40 and constitutes a portion of a drive wheel 44 which is rotatable about an axis of rotation 46, a bearing structure 48 disposed about the drive hub 42, and a bearing cage 50 disposed about and in supporting relation to the bearing structure 48. The bearing structure 48 accommodates relative rotation between the bearing cage 50 and the drive hub 42. The drive wheel 44 also includes a radially outwardly facing surface 51 which is frictionally coupled to the belt 34.

The idler structure 36 includes a slider assembly 52 and an idler wheel 54 which are respectively disposed in sliding relation to the roller frame 24 and rotatably mounted on the slider assembly 52 about an idler shaft 56 having an axis of rotation 58. A constraining element 59 having a constraining axis 60 protrudes laterally from the slider assembly 52 and resides in a longitudinal slot 61 formed in the roller frame 24 so as to constrain relative movement between the slider assembly 52 and roller frame 24 to a longitudinal recoil path. FIG. 4 provides a detailed illustration of the idler structure 36 and its relationship with the belt 34 and roller frame 24.

A biasing/recoil apparatus 62 illustrated in FIG. 2 constitutes a first embodiment of the biasing/recoil apparatus 26 of FIG. 1 and includes an idler strut 63 housed within the roller frame 24 and a connecting pin 64 having a connection axis 65. The idler strut 63 is pivotally connected to the slider assembly 52 in front of the axis of rotation 58 by the connecting pin 64 and is engaged with an idler spring retainer 66. While the constraining element 59 of the embodiments illustrated herein constitutes the connecting pin 64, it is to be understood that one of ordinary skill in the art could, within the teachings of the present invention, suitably modify the idler structure 36 and use the idler shaft 56 as the constraining element 59 in place of the connecting pin 64. As illustrated, the axes 46,58, and 60 are preferably coplanar for purposes of minimizing the stress induced in the drive structure 38, idler structure 36, and biasing/recoil apparatus 62.

The biasing/recoil apparatus 62 also includes a drive strut 68 which extends from the bearing cage 50 through a spherical bearing 70 to a drive spring retainer 72. A compression spring 74 constitutes a portion of the apparatus 62 and has opposite ends which are engaged with the respective spring retainers 66,72. The drive strut 68 includes a first member 76 and a second member 78 within which the first member 76 is disposed. The first drive strut member 76 has external threads 80 and the second drive strut member 78 has internal threads (not shown) and a gripping portion 82.

FIG. 3 illustrates a second embodiment 84 of the biasing/recoil apparatus 26 with the primary differences between the embodiments 62 and 84 residing in the cooperation of the first and second members of the respective drive struts. It is to be understood that the remaining elements of the undercarriage 14 illustrated in FIG. 2 also exist in FIG. 3 and, for the sake of clarity, are not duplicated in FIG. 3. The biasing/recoil apparatus 84 of FIG. 3 includes the same elements as does the biasing/recoil apparatus 62 of FIG. 2 except that the apparatus 84 includes a drive strut 86 having a first and a second member 88,90, respectively, instead of the drive strut 68 of FIG. 2. The first member 88 has a circular body portion 92, external threads 94 adjacent a proximal end 96 of the body portion 92, and a circular seal 98 partially recessed in and disposed about a distal end 100 of the body portion 92. The second member 90 of the drive strut 86 has a cylindrical shape with an open, proximal end 102 through which the distal end 100 of the first member 88 is received and a closed, distal end 104 which engages the spring retainer 72. The first member 88, the second member 90, and the seal 98 cooperatively define a pressurizable chamber 106 which volume varies with the relative longitudinal position of the first and second members 88,90. An opening 108 through the second member 90 permits transmission of pressurized fluid into the chamber 106, along a path 110, the details of which are not relevant to the present invention. A locking assembly 112 includes a nut 114 and a thrust washer 116 which are respectively threadably engaged with the first member 88 and abuttably engaged with the nut 114 and the second member 90.

Industrial Applicability

The biasing/recoil apparatus 26 must be appropriately adjusted to provide the tension required for successful frictional coupling of the belt 34 to the drive surface 51 and to permit recoil of the idler structure 36 upon ingestion of debris between the belt 34 and other undercarriage components.

For both embodiments 62,84 of the biasing/recoil apparatus, the tensioning force of the spring 74 is applied to the idler structure 36 in front of the axis 58 in a "pulling" rather than a "pushing" mode for purposes of correcting instead of aggravating a slider assembly 52/roller frame 24 configuration which has been "cocked" by other forces. To tension the belt 34 by using the apparatus 62, a wrench or similar device is mated with the gripping portion 82 of the drive strut's second member 78 and rotated to provide relative rotational motion and longitudinal displacement of the threadably engaged first and second members 76,78, respectively, of the drive strut 68. The relative longitudinal displacement of the drive strut members 76,78 results in relative rotational motion between the second member 78 and the spring retainer 72 which motion is accommodated by the spherical bearing 70. Longitudinal displacement of the strut member 76 away from the idler structure 36 causes the spring retainer 72 to advance toward the idler structure 36. As a result of the aforementioned motion, the length of the coil spring 74 decreases and subsequently provides a greater biasing force between the drive and idler structures 36,38, respectively, through the drive strut 68,86, idler strut 63, bearing cage 50, and bearing 48 so as to increase the tension in the belt 34 and cause greater frictional engagement thereof with the drive surface 51. Of course, it is to be understood that rotation of the second member 78 in a direction opposite that previously described causes the first member 76 to longitudinally approach the idler structure 36 and thus decrease the biasing force in the spring 74 and in the belt 34.

Substantial torques are required to relatively rotate and extend the first and second members 76,78 to provide the requisite belt tension for frictionally coupling the belt 34 to the drive surface 51 of the drive structure 38. Accordingly, the embodiment of FIG. 3 is somewhat preferred over that of FIG. 2 in that the locking assembly 112 in FIG. 3 is only used for preventing the first member 88 from being further inserted into the second member 90 instead of also inducing the relative longitudinal displacement of the members 88,90.

In using the biasing/recoil apparatus 84 of FIG. 3 to increase the tension in the belt 34, pressurized fluid such as grease is transmitted under pressure through the port 108 into the pressurizable chamber 106. The fluid pressure in the chamber 106 is increased to induce opposite relative longitudinal displacement of the drive strut's first and second members 88,90, respectively, until the desired belt tension is achieved. Thereafter, the locking nut 114 is rotated in the appropriate direction to longitudinally advance it and the adjacent thrust washer 116 until the thrust washer 116 abuttably engages the second member 90. The hereinbefore described longitudinal displacement of the first and second members 88,90, respectively, tends to move the spring retainer 72 toward the idler structure 36. However, due to the substantially inextensible nature of the elastomeric belt 34, the opposing spring retainer 66 moves very little. Accordingly, the spring 74 assumes a shortened configuration and provides greater biasing force on and thus tension in the elastomeric belt 34. The locking nut 114, when rotated, drives the thrust washer 116 into longitudinally abutting engagement with the second member 90 of the drive strut 86. The fluid pressure in pressurizable chamber 106 may then be relieved to reduce the pressure load on the seal member 98. The biasing/recoil apparatus 84 of FIG. 3 is also preferred to the biasing/recoil apparatus 62 of FIG. 2 because there is no relative rotation under load between the spring retainer 72 and the second member 90 of the drive strut 86.

During movement of the work vehicle 10, the elastomeric belt 34 rotates about the driver structure 38 to which it is frictionally coupled, about the idler structure 36, and under the rollers 28 which uniformalize the ground engagement pressure exerted by the belt 34. The idler wheel 54, during vehicular movement, rotates about the axis 58 and reciprocates during recoil/recovery thereof. Upon injestion of debris between the belt 34 and the undercarriage components (drive wheel 44, idler wheel 50, and the rollers 28), the slider assembly 52 recoils by moving longitudinally towards the drive structure 38. During such recoil, the spring retainer 66 is induced by the idler strut 63 and idler structure 36 to move toward the opposing spring retainer 72 and controllably increase the spring force and belt tension. Such increased belt tension manifests itself in a first force on the drive structure 38 in a direction toward the idler structure 36. The driver bearing cage 50, drive strut 68,86 (depending on the chosen biasing/recoil apparatus), and spring retainer 72 under inducement of the spring 74's biasing force exert a second, compensating force on the drive structure 38 which is equal in magnitude but opposite in direction to the first force. Upon expulsion of the debris, the slider assembly 52 recovers its steady state position by moving longitudinally away from the drive structure 38 until the belt tension counteracts the spring force.

It should now be apparent that a tensioning/recoil apparatus 26 has been provided for adjusting the tension in an inextensible, elastomeric belt 34 which is frictionally coupled to the driving surface 51 of the driver structure 38. Such improved biasing/recoil apparatus 26 accommodates debris ingestion between the undercarriage components and the belt 34 without subjecting such components to undue stress while isolating the recoil action of the idler structure 36 to the roller frame 20 constraining the recoil action to the longitudinal direction and self correcting any cocked configuration of the idler structure 36/roller frame 24.

We claim:

1. A belt laying work vehicle comprising:
    a main frame;
    a drive structure extending from a lateral side of said main frame and including a rotatable drive wheel having a drive axis of rotation;
    a roller frame disposed on a lateral side of and in rigid supporting relation to said main frame;
    an idler structure slidably mounted on said roller frame and including an idler shaft having an idler axis of rotation and a rotatable idler wheel mounted on said shaft;
    an endless, inextensible elastomeric belt entrained about said wheels;
    means for constraining and permitting relative movement between said idler structure and roller frame to a longitudinal recoil path during rotation of said idler structure; and
    means for adjustably biasing said belt into frictional driven engagement with said drive structure with a first force and for exerting a second compensating force on said drive structure which is equal in magnitude but opposite in direction to said first force, said biasing and force compensating means including apparatus for transmitting said first and compensating forces between said idler and drive structures independent of said main and roller frames.

2. The belt laying work vehicle of claim 1 wherein said biasing and force compensating means comprises:
    a spring cooperatively associated with said roller frame;
    first means for connecting one end of said spring to said drive structure;
    second means for connecting the other end of said spring to said idler structure, wherein one of said connecting means includes a spring retainer engaged with an end of said spring; and
    means for adjusting the distance between said spring retainer and the structure connected by said one connecting means.

3. The belt laying work vehicle of claim 2, wherein said adjusting means comprises:
    a first member connected to one of said structures;
    a second member engaged with said spring retainer and disposed about said first member; and
    means for locking said first and second members together.

4. The belt laying work vehicle of claim 3, wherein said locking means comprises:

means for threadably engaging said first member and for abuttably engaging said second member.

5. The belt laying work vehicle of claim 4, further comprising:
means for fluidly separating said spring retainer and said first member.

6. The belt laying work vehicle of claim 5, wherein said fluid separating means comprises:
said second member having an open and a closed end;
said first member being reciprocatably receivable in said open end of said second member;
means for fluidly sealing between said first and second members and, together with said first and second members, defining a variable volume chamber; and
means for transmitting pressurized fluid into said chamber.

7. The belt laying work vehicle of claim 3, wherein said locking means comprises:
means for threadably engaging said first and second members.

8. The belt laying work vehicle of claim 3, wherein said second member and said spring retainer are engaged at a spherical bearing.

9. The belt laying work vehicle of claim 2 wherein said first connecting means comprises:
a bearing disposed about said drive structure;
a bearing cage supportably disposed about said bearing; and
a drive strut extending between said spring and said bearing cage.

10. The belt laying work vehicle of claim 2 wherein said constraining means comprises:
one of said idler structure and said roller frame having a longitudinal slot; and
a constraining element which resides in said slot includes a constraining axis and protrudes from the other of said idler structure and said roller frame.

11. The belt laying work vehicle of claim 10 wherein said second connecting means comprises:
an idler strut biased by said spring; and
a connecting pin which has a connection axis and which joins said idler strut to said idler structure.

12. The belt laying work vehicle of claim 11 wherein said constraining element constitutes one of said idler shaft and said connecting pin.

13. The belt laying work vehicle of claim 11 wherein said connection axis and said drive axis are disposed on opposite longitudinal sides of said idler axis.

14. The belt laying work vehicle of claim 13 wherein said idler and connection axes lie in a common plane.

15. The belt laying work vehicle of claim 10 wherein said constraining axis, idler axis, and drive axis are coplanar.

16. The belt laying work vehicle of claim 15 wherein said drive axis lies in said common plane.

17. A method for adjusting the tension of an endless, inextensible ground engagement, vehicle propulsion belt entrained about a drive structure extending from a vehicle main frame, having a radially outwardly facing surface, and an axis of rotation and about an associated idler structure slidably supported on a roller frame which is rigidly connected to the main frame, said idler structure being connected to an idler strut and said drive structure being rotatably connected to a drive strut wherein said struts are engaged with opposite ends of a spring, said method comprising:
lengthening one of said struts until said belt is frictionally coupled with and driven by said radially outwardly facing surface with a first force;
transmitting a second, compensating force between said idler and drive structures independent of said main and roller frames;
locking said strut in its lengthened configuration; and
constraining relative movement of said idler structure and said roller frame to a longitudinal recoil path during rotation of said idler structure.

18. A belt laying work vehicle comprising:
a main frame;
a drive structure including a drive wheel extending from a lateral side of said main frame and having a drive axis of rotation;
a roller frame disposed on a lateral side of and in rigid supporting relation to said main frame;
an idler structure longitudinally slidably mounted on said roller frame and including an idler shaft having an idler axis of rotation and a rotatable idler wheel mounted on said shaft, one of said idler structure and said roller frame having a longitudinal slot;
an endless, inextensible elastomeric belt entrained about said wheels;
a constraining element residing in said slot, protruding from the other of said idler structure and said roller frame having a constraining axis, and being displaceable in said slot during rotation of said idler wheel and longitudinal movement of said entraining belt; and
means for adjustable biasing said wheels in opposite directions with a force to cause said belt to be in frictional driven engagement with said drive wheel, said biasing means including means for transmitting said force between said structures independent of said main and roller frames.

19. The belt laying work vehicle of claim 18 wherein said adjustable biasing means includes:
a spring cooperatively associated with said roller frame;
an idler strut biased by said spring; and
a connecting pin joining said idler strut to said idler structure and having a connection axis, said connection axis and said drive axis being disposed on opposite longitudinal sides of said idler axis.

20. A belt laying work vehicle comprising:
a main frame;
a drive structure including a rotatable drive wheel extending from a lateral side of said main frame and having a drive axis of rotation;
a roller frame disposed on a lateral side of and in supporting relation to said main frame;
an idler structure operationally slidably mounted on said roller frame and including an idler shaft having an idler axis of rotation and a rotatable idler wheel mounted on said shaft;
an endless, inextensible elastomeric belt entrained about said wheels;
means for constraining relative operational translational movement between said idler structure and said roller frame to a longitudinal recoil path;
a spring having opposing ends cooperatively associated with said roller frame;
an idler strut connecting one end of said spring to said idler structure about a connection axis, said connection axis and said drive axis being disposed on opposite longitudinal sides of said idler axis; and
means for adjusting the distance between said spring ends and biasing said belt into frictional driven engagement with said drive wheel.

21. The belt laying work vehicle of claim 20 wherein said idler and connection axes lie in a common plane.

* * * * *